(12) United States Patent
Guelman

(10) Patent No.: US 11,531,930 B2
(45) Date of Patent: Dec. 20, 2022

(54) SYSTEM AND METHOD FOR MONITORING MACHINE LEARNING MODELS

(71) Applicant: ROYAL BANK OF CANADA, Montreal (CA)

(72) Inventor: Leandro Axel Guelman, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 594 days.

(21) Appl. No.: 16/351,187

(22) Filed: Mar. 12, 2019

(65) Prior Publication Data

US 2019/0279109 A1    Sep. 12, 2019

Related U.S. Application Data

(60) Provisional application No. 62/641,537, filed on Mar. 12, 2018.

(51) Int. Cl.
   *G06N 20/00* (2019.01)
   *G06F 16/28* (2019.01)

(52) U.S. Cl.
   CPC ........... *G06N 20/00* (2019.01); *G06F 16/285* (2019.01)

(58) Field of Classification Search
   CPC .............................. G06N 20/00; G06F 16/285
   See application file for complete search history.

(56) References Cited

U.S. PATENT DOCUMENTS

| | | | |
|---|---|---|---|
| 9,245,226 B2* | 1/2016 | Wolff | G06N 20/00 |
| 9,542,646 B1* | 1/2017 | Baughman | G06N 20/00 |
| 9,760,834 B2* | 9/2017 | Chae | G16B 40/30 |
| 10,410,135 B2* | 9/2019 | Shumpert | G06N 20/00 |
| 10,546,237 B2* | 1/2020 | Heifets | G06N 3/08 |
| 10,896,756 B2* | 1/2021 | Cook | G06N 20/20 |
| 2016/0321542 A1* | 11/2016 | Towal | G06N 3/088 |
| 2017/0255874 A1* | 9/2017 | Chafle | G06N 20/10 |
| 2018/0074096 A1* | 3/2018 | Absher | G01R 13/02 |
| 2018/0101529 A1* | 4/2018 | Karpistsenko | G06F 16/1873 |
| 2019/0147357 A1* | 5/2019 | Erlandson | G06N 3/08 706/12 |

OTHER PUBLICATIONS

Grier, 2005.*
Edelman, 2008.*
Wirth, 1976.*
Dam, 2013.*
Goffman, 1974.*
Kuhn, 1962.*

(Continued)

*Primary Examiner* — Michael I Ezewoko
(74) *Attorney, Agent, or Firm* — Norton Rose Fulbright Canada LLP

(57) ABSTRACT

Systems and methods are provided to monitor performance of a machine learning model, the method may include steps of: receiving or storing one or more model data sets representative of the machine learning model, wherein the machine learning model has being trained with a first set of training data; analyzing the first set of training data based on one or more performance parameters for the machine learning model, to generate one or more performance data sets; and process the one or more performance data sets to determine one or more values representing a performance of the machine learning model.

19 Claims, 12 Drawing Sheets

(56) References Cited

OTHER PUBLICATIONS

Hayles, 2005.*
Lakoff, 1980.*
Mindell, 2015.*
Treffert, 2010.*
Krawczyk, 2017.*
Englund, 2006, pp. 391-400, Elsevier.*
Tsukioka, 2014, IEEE, pp. 1591-1596.*
Supervised distance metric learning through maximization of the Jeffrey divergence, Nguyen, 2017. pp. 215-225.*
Kullback-Leibler distance-based enhanced detection of incipient anomalies, Harrou, ScienceDirect, Elsevier, 2016, pp. 73-87.*
Costa, 2018.*
Bifet, 2007.*
Raza, 2015.*
Sobolewski, 2013.*

* cited by examiner

| Last Score Batch Count | Population Stability Index |
|---|---|
| 12500 | 0.0045 |
| Stability Index<br>X1: 0.0022<br>(worst weighted feature) | Model Performance<br>ks: 0.7174 |

FIG. 5B

SYSTEM AND METHOD FOR MONITORING MACHINE LEARNING MODELS

CROSS-REFERENCE

This application claims the benefit of and priority to U.S. provisional patent application No. 62/641,537 filed on Mar. 12, 2018, the entire content of which is herein incorporated by reference.

FIELD

The present disclosure generally relates to the field of machine learning, and more specifically, to monitoring performance of machine learning models.

INTRODUCTION

The success of machine learning models enables many novel applications in areas such as computer vision, speech recognition, and natural language processing. However, as the number of machine learning models in deployment increases, there may be a need to systematically monitor the performance of these models over time.

SUMMARY

Embodiments disclosed herein may provide systems and methods for monitoring machine learning models.

In one aspect, there is provided a computer implemented system for monitoring and improving a performance of one or more machine learning models, the system including: at least one memory storage device storing one or more model data sets representative of a machine learning model; at least one training engine configured to train the machine learning model; and at least one computer processor configured to, when executing a set of machine-readable instructions: receive or store the one or more model data sets representative of the machine learning model, wherein the machine learning model has being trained with a first set of training data; analyze the first set of training data, based on one or more performance parameters for the machine learning model, to generate one or more performance data sets; and process the one or more performance data sets to determine one or more values representing a performance of the machine learning model.

In some embodiments, the computer processor is configured to select a second set of training data based on the performance data and re-train the machine learning model using the second set of training data.

In some embodiments, the computer processor is configured to analyze one or more output data sets of the machine learning model to generate the one or more performance data sets.

In some embodiments, the computer processor is configured to adjust one or more weights or one or more filters of the machine learning model based on the second set of training data.

In some embodiments, the computer processor is configured to store the adjusted one or more weights or one or more filters of the machine learning model.

In some embodiments, the one or more performance parameters comprises at least one of: a regression feature and a classification feature of the machine learning model.

In some embodiments, the computer processor is configured to process the first set of training data to determine at least one of: model development data and scoring data.

In some embodiments, the first set of training data comprises labelled data.

In some embodiments, the performance data sets comprise features of the first set of training data.

In some embodiments, the computer processor is configured to select a second set of training data based on the model development data or scoring data.

In some embodiments, the computer processor is configured to display the one or more values representing the performance of the machine learning model.

In other aspects, there is provided a computer-implemented method for monitoring and improving a performance of a machine learning model, the method comprising: receiving or storing one or more model data sets representative of the machine learning model, wherein the machine learning model has being trained with a first set of training data; analyzing at least one of the first set of training data and the one or more model data sets, based on one or more performance parameters for the machine learning model, to generate one or more performance data sets; and process the one or more performance data sets to determine one or more values representing a performance of the machine learning model.

In some embodiments, the method includes selecting a second set of training data based on the performance data and re-training the machine learning model using the second set of training data.

In some embodiments, the method includes analyzing one or more output data sets of the machine learning model to generate the one or more performance data sets.

In some embodiments, the method includes adjusting one or more weights or one or more filters of the machine learning model based on the second set of training data.

In some embodiments, the method includes storing the adjusted one or more weights or one or more filters of the machine learning model.

In some embodiments, the one or more performance parameters comprises at least one of: a regression feature and a classification feature of the machine learning model.

In some embodiments, the method includes processing the first set of training data to determine at least one of: model development data and scoring data.

In some embodiments, the first set of training data comprises labelled data.

In some embodiments, the performance data sets comprise features of the first set of training data.

In some embodiments, the method includes selecting a second set of training data based on the model development data or scoring data.

In some embodiments, the method includes displaying the one or more values representing the performance of the machine learning model.

In some aspects, there is provided a computer implemented system for determining an output based on a set of input using a machine learning model, the system including: at least one memory storage device storing one or more model data sets representative of a machine learning model; and at least one computer processor configured to, when executing a set of machine-readable instructions, execute the one or more model data sets representative of the machine learning model to generate an output based on a set of input data, wherein the machine learning model has being trained based on a monitored performance of the machine learning model.

In some embodiments, the machine learning model has been trained with a first set of training data, and wherein the processor is configured to: analyze the first set of training data, based on one or more performance parameters for the machine learning model, to generate one or more performance data sets; and process the one or more performance data sets to determine one or more values representing a performance of the machine learning model.

In some embodiments, the processor is configured to: generate a second set of training data based on the one or more performance data sets and re-train the machine learning model based on the second set of training data.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 5A and 5B illustrate an overview page of an example user interface of a web application monitoring model performances.

DETAILED DESCRIPTION

As the number of machine learning models in deployment increases, there is a need to systematically monitor the performance of these models over time. In some embodiments, a system for monitoring machine learning model performance, which is also referred to as "model performance monitor (MPM) system", may include components such as population stability index unit, feature analysis unit, performance metric unit, and a model calibration unit.

In some embodiments, the output of one or more of population stability index unit, feature analysis unit, performance metric unit, and a model calibration unit can generate one or more alerts regarding the extent to which the performance of a machine learning model is deteriorating over time, and in turn generate information regarding the plausible root causes for the deteriorating performance of the machine learning model. The data output from these units may be used to further tune and improve the performance, such as efficiency, of the machine learning model, thereby increasing the efficiency of a computing processor configured to perform one or more actions using the machine learning model.

Figure 1:
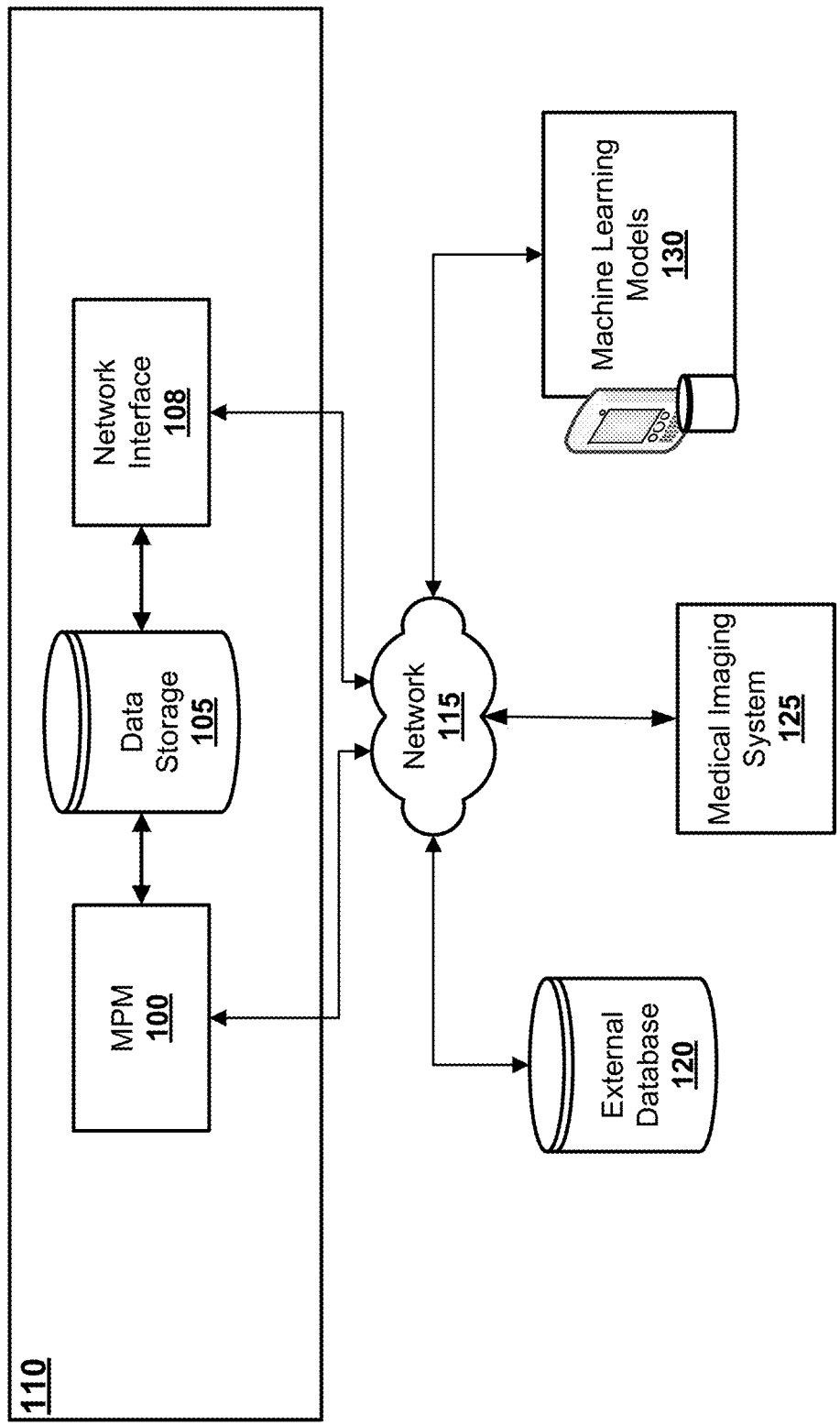
FIG. 1 is a schematic block diagram of an example of an environment for a system for monitoring machine learning model performance, according to some embodiments.

FIG. 1 is a schematic block diagram of an environment for a system for monitoring machine learning model performance, according to some embodiments. A platform 110 configured for model performance monitoring, receiving a one or more machine learning models 130 (e.g., stored in the form of one or more model data sets) through network 115 is provided. The machine learning architecture 130 is implemented in tangible, concrete forms of computer-implemented systems, methods, devices, and computer-readable media storing machine readable instructions thereof. For example, the system may operate in the form of computer implemented devices in a data center hosting a cluster of devices used for maintaining data sets representative of the neural network.

Platform 110 includes a model performance monitoring (MPM) system 100. System 100 may be software (e.g., code segments compiled into machine code), hardware, embedded firmware, or a combination of software and hardware, according to various embodiments.

An example application of platform 110 may be in a medical community, such as a hospital, where medical images from a medical imaging system 125 may be transmitted via network 115 to machine learning model 130, which can be configured to process the medical images in order to determine if one or more medical images likely contain a tumour. MPM system 100 may in this case monitor a performance of the machine learning model 130, and generate one or more performance data sets based on the monitoring. The performance data sets may be processed to output one or more values that can be displayed on a display device, to tell a user of the medical imaging system 125 if the machine learning model 130 is performing well. In some embodiments, the machine learning model may have been trained with a first set of training data, which may be stored in external database 120.

MPM system 100 may be configured to analyze one or more of a plurality of information, such as the first set of training data, one or more output data sets of the machine learning model, and the one or more model data sets representative of the machine learning model 130, in order to generate the performance data. In some embodiments, MPM 100 may be configured to generate the performance data based one or more performance parameters, such as population stability, feature analysis, and so on.

Based on the performance data sets, MPM system 100 may be configured to detect, over time, that the machine learning model 130 has a deteriorating performance and in turn, determine one or more features that may have contributed to or caused the deteriorating performance. Based on the determined features or causes of the deteriorating performance, MPM system 100 may be configured to generate a second set of training data to re-train and improve the performance of the machine learning model 130. For example, MPM system 100 may determine, based on a mapping of the first set of training data and the output of the machine learning model, that the population stability is low, which means that the first set of training data is likely outdated. This may indicate that the medical images currently processed by the model belong to a population that have a different feature, such as a different mean age, compared to the first set of medical images that were used as training data to train the model. In this case, MPM system 100 may be configured to generate a second set of training data that may have the proper feature such as the correct mean age, in order to improve the performance of machine learning model 130.

In other embodiments, platform 110 may be implemented in a financial institution where the machine learning model 130 may be applied to make decisions regarding financial vehicles, such as determining if an applicant for a mortgage application should be granted the application for mortgage based on a likelihood of default rate for the applicant.

As described above, MPM system 100 is configured to receive one or more model data sets representative of one or more machine learning models 130, and may receive additional data from external database(s) 120 through network 115. MPM system 100 may be configured to implement one or more components or units for monitoring performance of machine learning model(s) 130 over time.

In some embodiments, MPM system 100 may be configured to monitor performance of machine learning models in deployment. The data sets representative of one or more machine learning models 130 may be stored in a database or a flat file. The data sets may be accessible to the MPM system 100 and to a statistical computing environment used by MPM system 100, so MPM system 100 can execute one or more functions for monitoring performance of machine learning model(s) 130. For example, the R environment, which may be used by MPM system 100, has core functionality to import data from a wide variety of formats, and to connect to databases to query and extract the data.

In some embodiments, the machine learning model, rankings of filters and weights, and associated rules, may be stored in data storage 105, which is configured to maintain one or more data sets, including data structures storing linkages. Data storage 105 may be a relational database, a flat data storage, a non-relational database, among others. In some embodiments, the data storage 105 may store one or more model data sets representative of the machine learning model.

A network interface 108 is configured to receive and transmit data sets representative of the machine learning models, for example, to a target data storage or data structures. The target data storage or data structure may, in some embodiments, reside on a computing device or system such as a mobile device.

External database 120 may provide additional data sets for monitoring the model performance by MPM system 100. Database 120 may be a relational database, a flat data storage, a non-relational database, among others.

Figure 2:
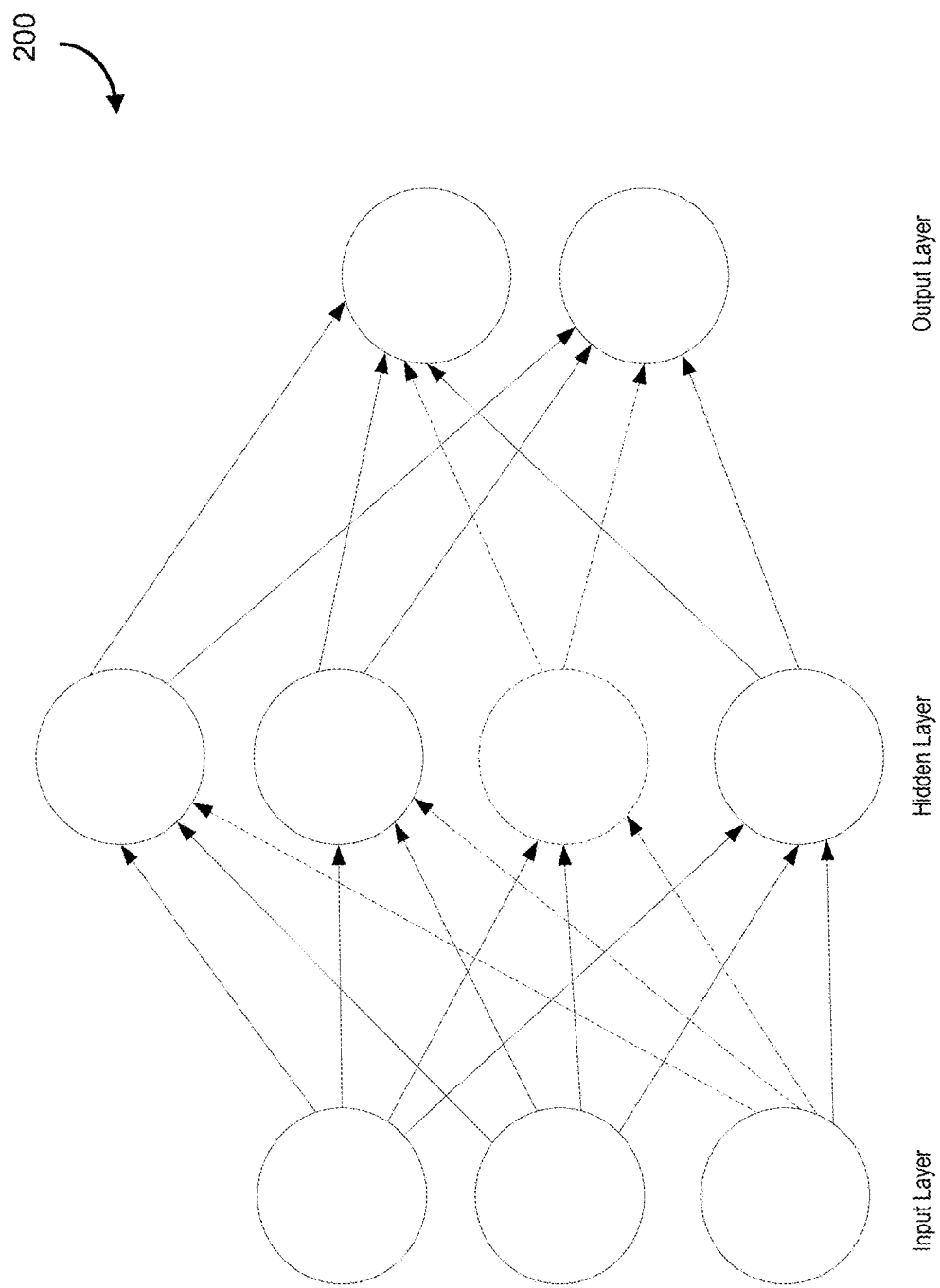
FIG. 2 is a schematic diagram of an example neural network, according to some embodiments.

FIG. 2 is a schematic diagram of an example machine learning model 200, according to some embodiments. In this example, the machine learning model 200 may be a neural network including an input layer, a hidden layer, and an output layer.

Figure 3:
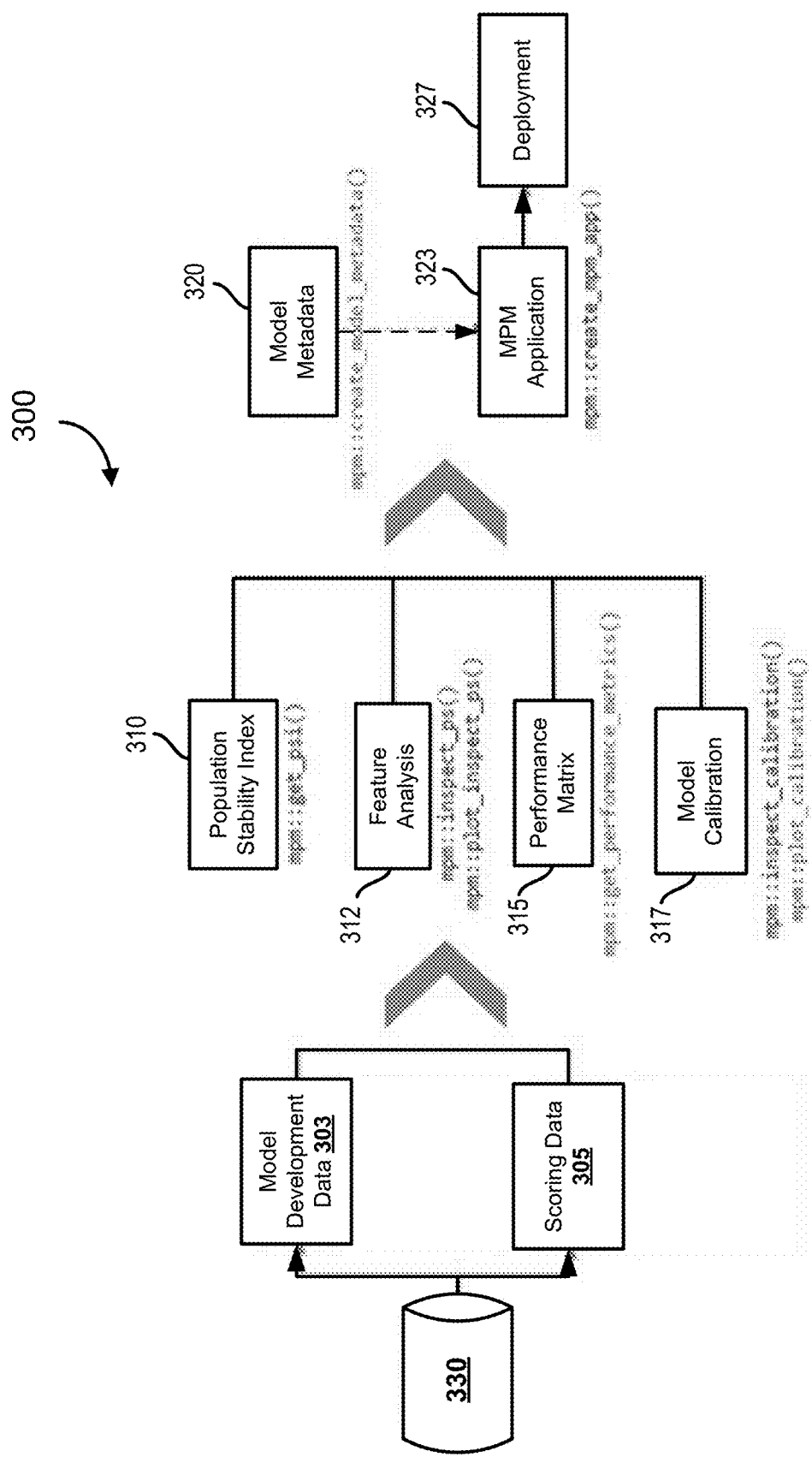
FIG. 3 is an example schematic block diagram of a system for monitoring model performance, according to some embodiments.

FIG. 3 is an example schematic block diagram of a MPM system 300 for monitoring model performance, according to some embodiments. MPM system 300 may be scalable and extended, and has the ability to integrate with other commonly used machine learning frameworks.

In some example embodiments, MPM system 300 may include four components: population stability index unit 310, feature analysis unit 312, performance matrix unit 315, and model calibration unit 317.

A machine learning model 130, 330 may use model development data 303 and output scoring data 305. Model development data 303 may include model input features, labels and model output or predictions. Scoring data 305 may include model input features, model output or predictions, and depending on the specific MPM component, label data may also be required.

Model development data 303 may include datasets used to build the machine learning model, such as training data. These data may be known and stored in a database. The machine learning model 130, 330 then may be used, during deployment, to generate output data such as predictions over time, which may also be stored in a database. The output data or predication data may be part of scoring data 305.

Population stability index unit may collect model output/prediction data from model development data 303 and scoring data 305. Feature analysis unit may collect input feature data from model development data 303 and scoring data 305. Performance metric unit may collect model output/prediction data and labels data from scoring data 305. Model calibration unit may collect model output/prediction data and labels data from scoring data 305.

In some embodiments, model development data 303 may include, without limitation, one or more of the following types of data: model development date; input feature data; response or label data; model output data; "group by" version data; and model version data.

In some embodiments, scoring data 305 may include, without limitation, one or more of the following types of data: score date; input feature data; response or label data with lag information; model output data; "group by" version data; and model version data.

MPM system 300 is configured to receive model development data 303 and outputs scoring data 305 from machine learning model 130, 330, and check that, at a minimum, certain required data elements are present in each of these datasets (e.g., model input features, model response, event dates, and so on). The list of required data elements may be determined by default setting within MPM system 300, or may be determined through administrator input.

In some embodiments, MPM system 300 may include or be connected to a machine learning model 130, 330. In some embodiments, MPM system 300 may simply receive model development data 303 and scoring data 305 from machine learning model 130, 330.

Model development data 303 and outputs scoring data 305 are then transmitted to population stability index unit 310, feature analysis unit 312, performance matrix unit 315, and model calibration unit 317.

Population stability index unit 310 may be configured to assess the stability of the output of the machine learning model (hereinafter "model") over time. For example, unit 310 may monitor the change in the distribution of a variable with respect to a reference distribution. If output data of the model is not stable according to a pre-determined threshold, unit 310 may be configured to process, over time, a distribution of input data fed to the model, and to determine how the input data may have changed the output data. In some embodiments, population stability index unit 310 may be implemented by a function get_psi( ) written in a suitable programming language, such as R. The function may be implemented using any other suitable programming language.

In some embodiments, one or more index values (I) may be generated by population stability index unit 310 using the following formula:

$$I = \sum_{i=1}^{n} \left[ \left( \frac{O_i}{\sum O} - \frac{E_i}{\sum E} \right) \times \log\left( \frac{O_i}{\sum O} \Big/ \frac{E_i}{\sum E} \right) \right]$$

where O and E are the observed (recent population) and expected (development sample) frequencies corresponding to bin i. Values of I<0.1 tend to be no cause for concern, while 0.1≤I<0.25 tend to indicate some cause of concern, and I≥0.25 may indicate that the population may be outdated.

Feature analysis unit 312 may be configured to assess the stability of the model inputs over time and determine their relative importance in the observed change in the output distribution of the model. In some embodiments, feature analysis 312 unit may be implemented by a function inspect_ps( ) written in a suitable programming language, such as R. The function may be implemented using any other suitable programming language.

In some embodiments, the function inspect_ps( ) may be used to monitor the change in the distribution of a variable with respect to a reference distribution. the function inspect_ps( ) may receive two types of data inputs: trainVar and scoreVar, where trainVar may be a vector (numeric or factor) with reference values for the variable to measure drift in distribution, and scoreVar may be a vector (numeric or factor) with new values for the same variable in trainVar. In addition, the function inspect_ps( ) may take inputs such as trainData and scoreData, where trainData is a data frame including reference values for the variables to measure drift in distribution, and scoreData is a data frame including the new values for the same variable included in trainData.

One or more index values (I) may be generated using J-divergence:

$$I = \left(\frac{O_i}{\sum_O} - \frac{E_i}{\sum_E}\right) \times \log\left(\frac{O_i}{\sum_O} \bigg/ \frac{E_i}{\sum_E}\right)$$

where O and E are the observed (recent population) and expected (development sample) frequencies corresponding to bin i.

In the event a given bin contains no trainVar or scoreVar observations, the index values I may be adjusted as follows:

$$I = \left(\frac{O_i + \gamma}{\sum_O} - \frac{E_i + \gamma}{\sum_E}\right) \times \log\left(\frac{O_i + \gamma}{\sum_O} \bigg/ \frac{E_i + \gamma}{\sum_E}\right)$$

where γ can be an adjustment factor set at 0.5.

Performance metrics unit 315 may be a comprehensive set of metrics to measure the accuracy of the models over time. For example, performance metrics unit 315 may store one or more performance parameters commonly used for regression and classification in machine learning models. In some embodiments, performance metrics unit 315 unit may be implemented by a function get_performance_metrics( ) written in a suitable programming language, such as R. The function may be implemented using any other suitable programming language.

In some embodiments, performance metrics unit 315 may be configured to output one or more metrics, which may include one or more of: auc variable, which represents an area under the curve for a binary classification model; precision variable, which is determined by true positives divided by the sum of true positives and false positives; recall variable, which is determined by true positives divided by the sum of true positives and false negatives; specificity variable, which is determined by true negatives divided by the sum of true negatives and false negatives; f1Score variable, which represents the f1 score; ks variable, which represents a Kolmogorov-Smirnov statistic; ce variable, which represents a classification error; log Loss variable, which represents a log loss or entropy loss for a binary outcome; brier variable, which represents a Brier score; mse variable, which represents a mean square error; rmse variable, which represents a root mean square error; and mae variable, which represents a mean absolute error, and so on.

Model calibration unit 317 may be configured to determine how a machine learning model is well-calibrated over time, such as the extent to which a distribution of output data of the model matches an expectation. For example, unit 317 may determine the extent to which the model predictions match an empirical probability estimate of the model's response variable. Unit 317 may also determine aspects of a model that may cause abnormal performance. In some embodiments, model calibration unit 317 unit may be implemented by a function inspect_calibration( ) written in a suitable programming language, such as R. The function may be implemented using any other suitable programming language.

In some embodiments, model calibration unit 317, through a function such as inspect_calibration( ), may return the observed values of an event versus the predicted values. It may handle binary classification and regression tasks.

In some embodiments, each of the functions for population stability index unit 310, feature analysis unit 312, performance matrix unit 315, and model calibration unit 317 may have a number of arguments with chosen default values, and may provide flexibility to customize the various performance components of MPM system 100.

The result of population stability index unit 310, feature analysis unit 312, performance matrix unit 315, and model calibration unit 317 may be in the form of output datasets, which can be transmitted to MPM application unit 323.

MPM application unit 323 may be an interactive web application implemented by a function create_mpm_app( ) written in a suitable programming language, such as R. The function may be implemented using any other suitable programming language. MPM application unit 323 may be configured to process and display one or more output datasets from population stability index unit 310, feature analysis unit 312, performance matrix unit 315, and model calibration unit 317. MPM application unit 323 may be deployed through deployment unit 327.

In some embodiments, MPM application unit 323 may include a Shiny web application by RStudio™. The deployment of the web application may be hosted through RStudio™ Connect.

In addition, a model metadata unit 320 can be used to receive, extract, process and/or transmit additional model information to MPM application unit 323. For example, model metadata unit 320 may capture various aspects related to model governance. Model metadata unit 320 may be implemented by a function create_model_metadata( ) written in a suitable programming language, such as R. The function may be implemented using any other suitable programming language.

MPM system 300 may monitor performance of machine learning models developed in any language.

In some embodiments, each of population stability index unit 310, feature analysis unit 312, performance matrix unit 315, and model calibration unit 317 may be independently operated within MPM system 300. That is, each of the four units 310, 312, 315, 317 can be turned on or off by a user through the web application. This function may be implemented by a simple Boolean argument to the application creation function for MPM application unit 323. There may be some complex data dependencies within MPM system 300 based on the logical parameter on the units 310, 312, 315, 317.

In some embodiments, unusual circumstances may be present in scoring data 305. For example, unusual circumstances may include: a) handling of missing values, b) dealing with levels of categorical features present at scoring time but not in the model development data, and c) range of predictions at scoring time falling outside the range observed at training, among others.

Figure 9:
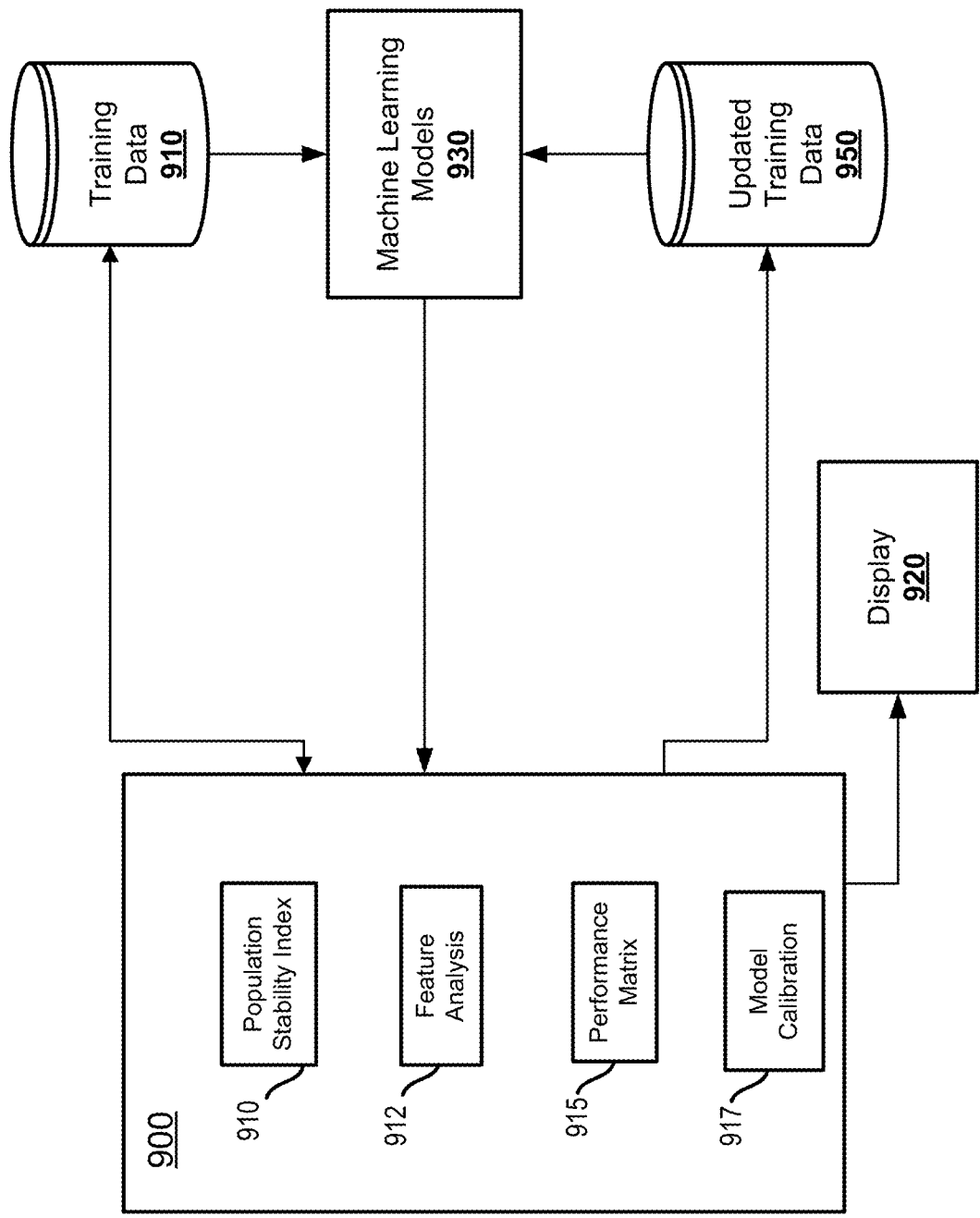
FIG. 9 shows a schematic diagram of an example MPM system for monitoring and re-training a machine learning model, according to some embodiments.

Referring now to FIG. 9, which shows a schematic diagram of an example MPM system 900 for monitoring and re-training a machine learning model 930, according to some embodiments. As illustrated, MPM system 900 may contain population stability index unit 910, feature analysis unit 912, performance matrix unit 915, and model calibration unit 917. One or more of these units may be configured to receive one or more data sets such as: a) one or more training data sets 910 that has or have been used to train the machine learning model 930; b) one or more output data sets from machine learning model 930 based on some input data (e.g. medical images); and/or c) one or more one or more model data sets representative of the machine learning model 930 including weights and filters of the model. MPM system 900 may process these data sets and generate performance data sets indicating a performance for the machine learning model 930. In some embodiments, MPM system 900 may generate values, such as population stability index values and display the values on a display device 920.

In addition, MPM system 900 may be configured to generate an updated (second) set of training data 950, that can be used to re-train machine learning model 930, in order to improve the performance of the machine learning model 930. MPM system 900 may, through feature analysis unit 912, determine that the updated training data 950 needs one or more updated parameters or features, and thereby include these parameters and features in the updated training data 950.

Figure 5A:

FIGS. 5A and 5B illustrate an overview page of an example user interface of a web application monitoring model performances. The web application may be implemented by MPM application unit 323 and deployed by deployment unit 327. Once properly deployed and operational, a user may log into the web application and choose an appropriate page within the web application for viewing model performance data. For example, the overview page in FIGS. 5A and 5B show model metadata, a last score data (e.g. Sep. 30, 2017), a stability index value for worst feature (e.g. X1: 0.0084), a last score batch count (e.g. 12500), a stability index value for worst weighted feature (e.g. X1: 0.0022), a population stability index (e.g. 0.0045) and a model performance (e.g. ks: 0.7174). A user can also navigate to other parts of the web application, for example, population stability page, feature analysis page, performance metrics page, or calibration page (see e.g. left hand menu of FIG. 5A).

Figure 6A:
FIGS. 6A, 6B and 6C illustrate a population stability index (PSI) page of an example user interface of a web application monitoring model performances.
Figure 6B:
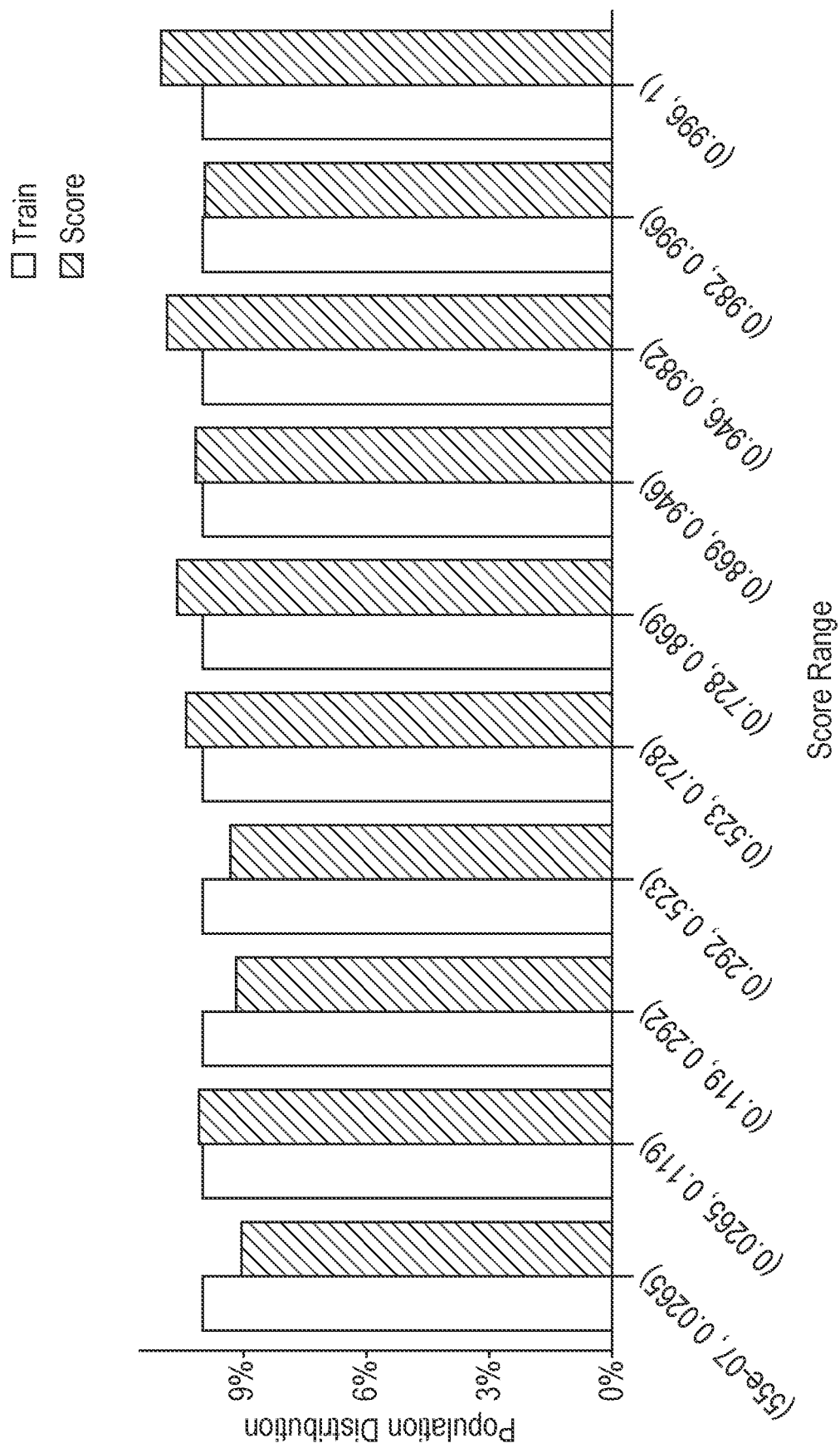
Figure 6C:
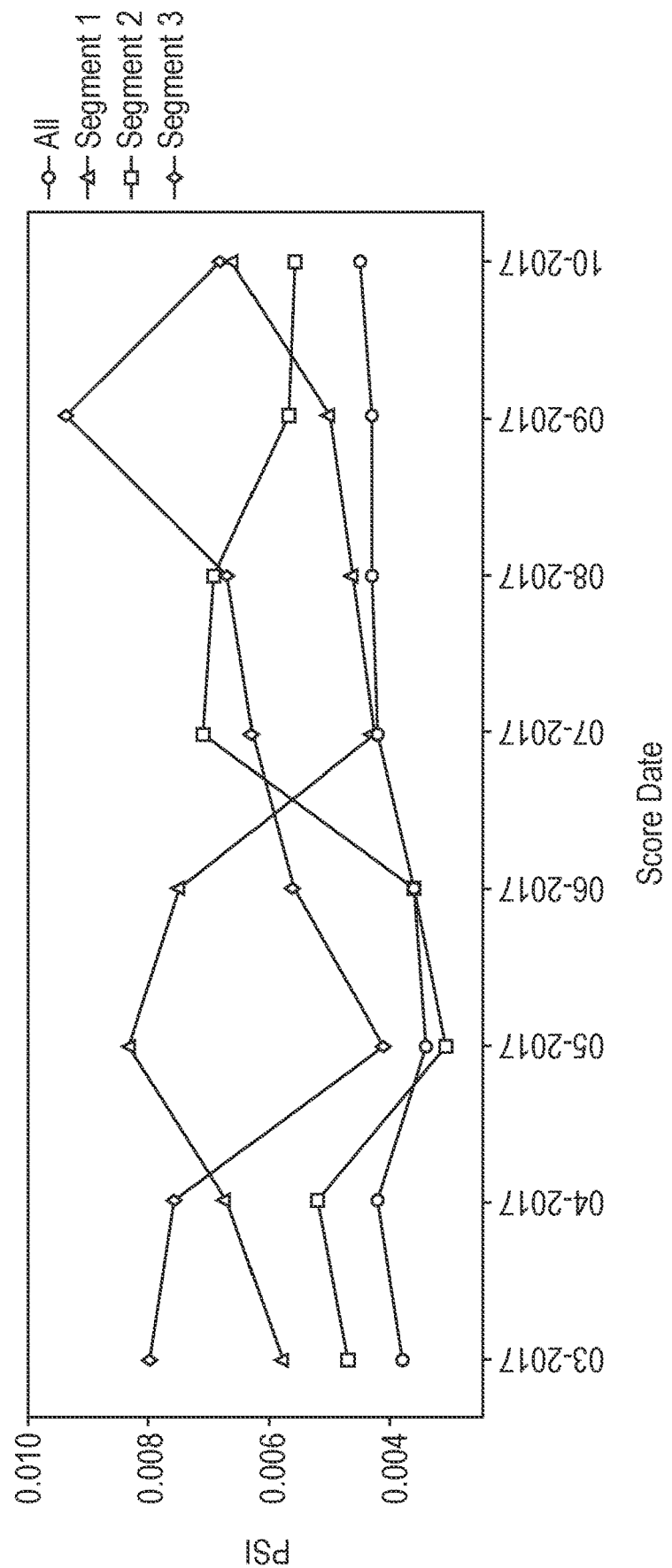

FIGS. 6A, 6B and 6C illustrate a population stability index (PSI) page of an example user interface of a web application monitoring model performances. The user input interface shown in FIG. 6A in particular lets a user choose a date and one or segments in a drop-down menu, and PSI level thresholds. FIG. 6B shows a population distribution graph in various score range for both score data (represented by shaded columns) and train data (represented by solid white columns). FIG. 6C shows a PSI graph for multiple segments (e.g. segments 1, 2, 3 and all).

Figure 7:
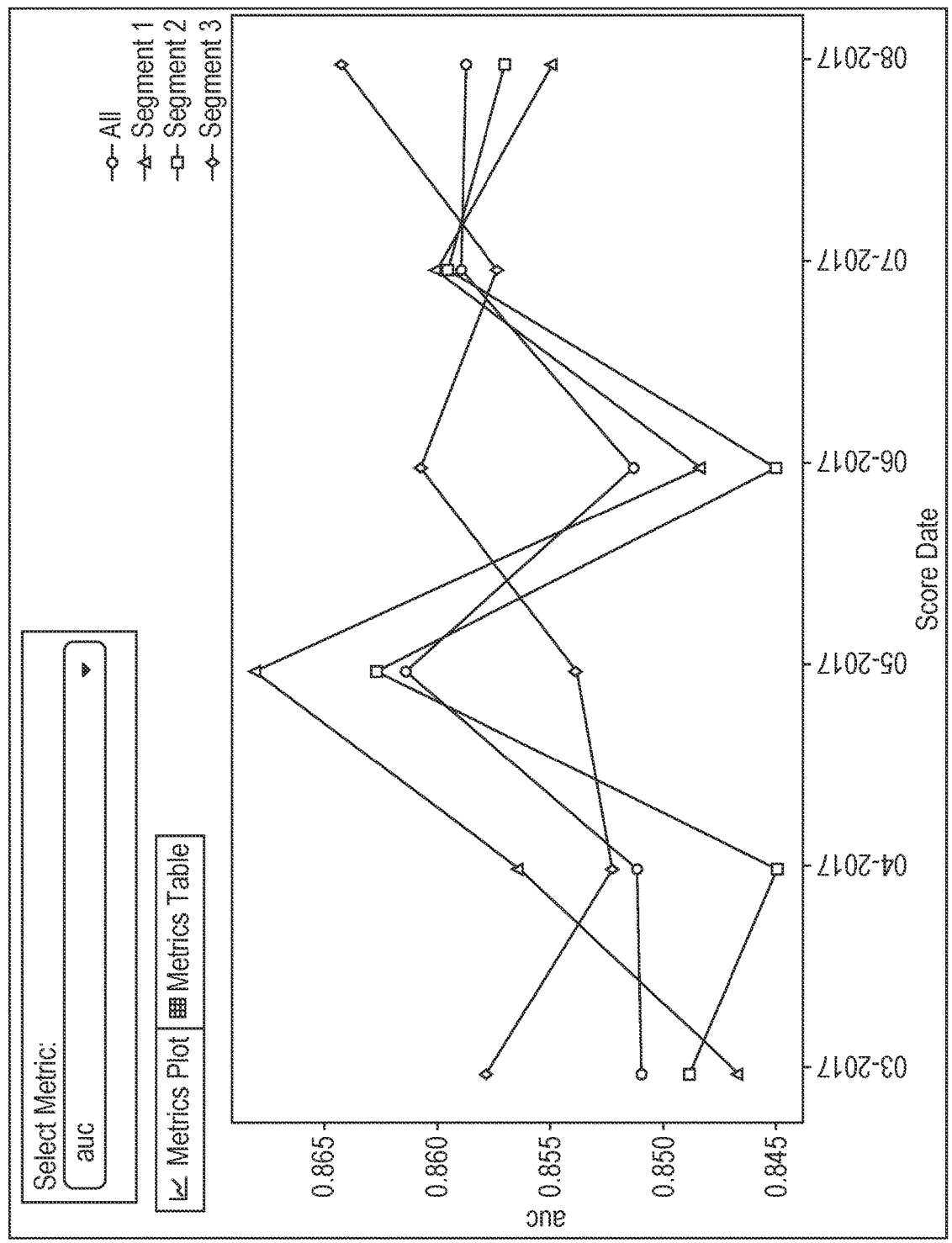
FIG. 7 shows a metrics plot page of an example user interface of a web application monitoring model performances.

FIG. 7 shows a metrics plot page of an example user interface of a web application monitoring model performances. A user can select a particular metric type for plotting from a drop-down menu. For example, an auc metrics plot is generated based on values of an auc variable that represents an area under the curve for a binary classification model.

Figure 8:
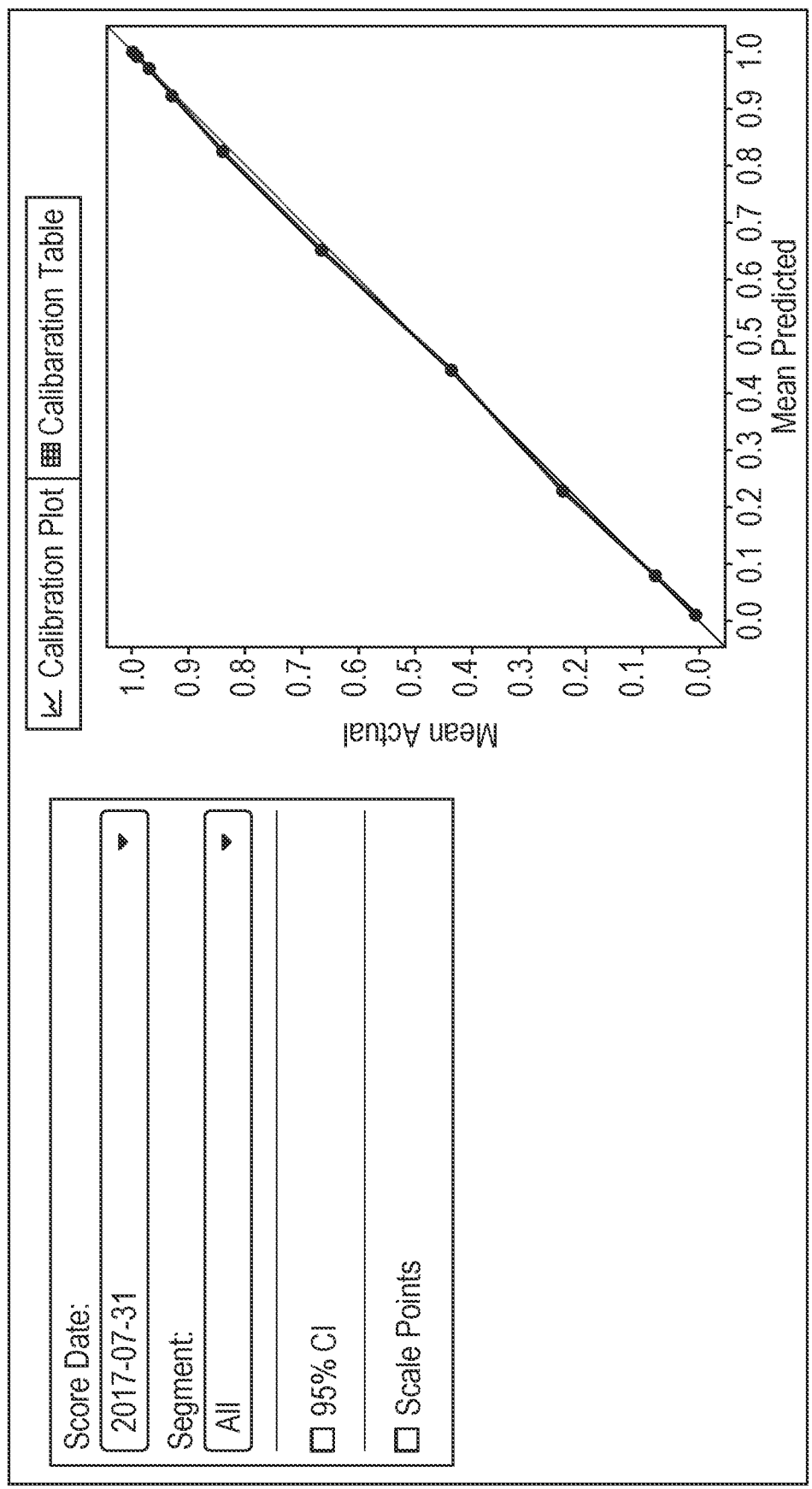
FIG. 8 shows a calibration plot page of an example user interface of a web application monitoring model performances.

FIG. 8 shows a calibration plot page of an example user interface of a web application monitoring model performances. A user can choose a date and one or segments in a drop-down menu. The illustrated calibration plot is generated based on mean actual values versus mean predicted values for all chosen segments.

Figure 4:
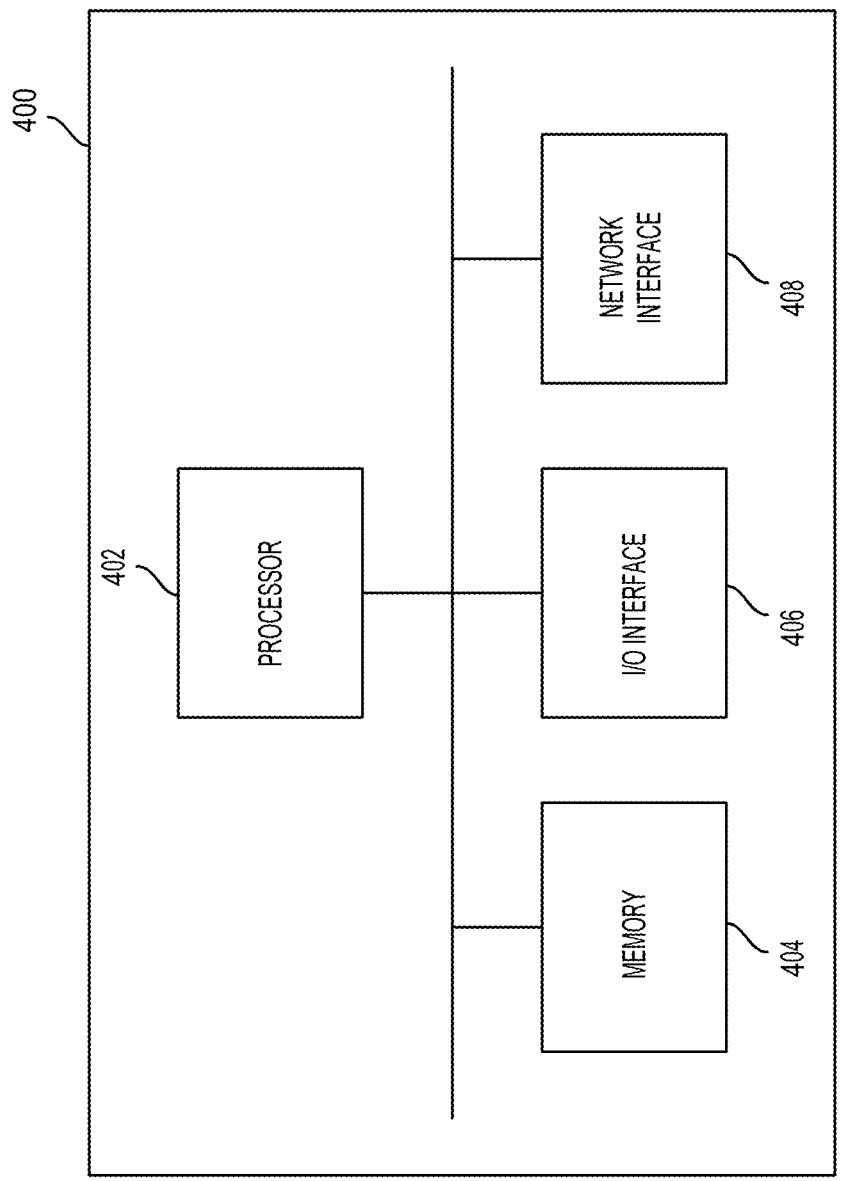
FIG. 4 is a block diagram of an example computing device, according to some embodiments.

FIG. 4 is a schematic block diagram of an example computing device 400 implementing MPM system 300, according to some embodiments. There is provided a schematic diagram of computing device 400, exemplary of an embodiment. As depicted, computing device 400 includes at least one processor 402, memory 404, at least one I/O interface 406, and at least one network interface 408. The computing device 400 is configured as a machine learning server adapted to dynamically maintain one or more neural networks.

Each processor 402 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 404 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 406 enables computing device 400 to interconnect with one or more input devices, such as a keyboard, mouse, camera, touch screen and a microphone, or with one or more output devices such as a display screen and a speaker.

An example technical specification package for a MPM system, using programming language R (from RStudio™), is included below.

Package "mpm"

Type Package
Title Model Performance Monitor
Version 0.0.1
Author Leo Guelman [aut, cre]
Maintainer Leo Guelman<leo.guelman@rbc.com>
Description A comprehensive framework for model performance monitoring.
Depends R (>=3.1.3), ggplot2 (>=2.2.1)
Imports data.table (>=1.10.4), doParallel (>=1.0.10), dplyr (>= 0.5.0), DT (>=0.2), foreach (>=1.4.3), htmltools (>=0.3.6), iterators (>=1.0.8), magrittr (>=1.5), ModelMetrics (>= 1.1.0), plotly (>=4.6.0), plyr (>=1.8.4), ROCR (>=1.0-7), scales (>=0.4.1), tibble (>=1.2), tidyr (>=0.6.1)
Suggests shiny, shinydashboard
License GPL-2|GPL-3
Encoding UTF-8
LazyData true
RoxygenNote 6.0.1
NeedsCompilation no R Topics Documented:
create_model_metadata
create_mpm_app
get_performance_metrics
get_psi
inspect_calibration
inspect_ps
plot_calibration
plot_inspect_ps create_model_metadata Create Model Metadata

Description
Model metadata are passed to create_mpm_app and will be reflected in the Shiny app.
Usage
create_model_metadata(model_name=NA, version=NA, description=NA,
date_created=NA, created_by=NA, last_date_modified=NA,
last_modified_by=NA, materiality="M", owner=NA, approver=NA,
user=NA, git_repository=NA)
Arguments
model_name A character string.
version A character string.
description A character string.
date_created A date value (must be of class Date).
created_by A character string.
last_date_modified
A date value (must be of class Date).
last_modified_by A character string.
materiality A character string of length 1. Options are "L" (low), "M" (medium) or "H" (high).
Defaults to "M".
owner A character string.
approver A character string.
user A character string.
git_repository A web link passed as a character string.
Value
A list.

create_mpm_app Create Model Performance Monitor App

Description
This function creates a Shiny App with custom model performance monitor menus.
Usage
create_mpm_app(ps_score_data, ps_features_data, psi_score_data,
    psi_features_data, pm_data, calib_data, title="Model Performance Monitor",
    titleWidth=300, psi_menu=TRUE, fa_menu=TRUE, pm_menu=TRUE,
    calib_menu=TRUE, key_metric=NULL, key_metric_danger=NULL,
    psi_danger=NULL, feature_psi_danger=NULL,
    feature_weighted_psi_danger=NULL,
    metadata=create_model_metadata
    ( . . . ),
    . . . )
Arguments
ps_score_data An object of class inspect_ps, created by mpm::inspect_ps.default.
ps_features_data
    A list created by mpm::inspect_ps.data.frame.
psi_score_data A tibble created by mpm::get_psi fitted on an object created with mpm::inspect_ps.default.
psi_features_data
    A list of tibbles created by mpm::get_psi fitted on an object created with mpm::inspect_ps.data.frame.
pm_data A tibble created by mpm::get_performance_metrics.
calib_data A tibble created by mpm::inspect_calibration.
title A title to show in the header bar.
titleWidth The width of the title area. This argument is passed to shinydashboard::dashboardHeader.
psi_menu Logical. If TRUE (default) a "Population Stability Menu" and related content are created in the Shiny app.
fa_menu Logical. If TRUE (default) a "Feature Analysis Menu" and related content are created in the Shiny app.
pm_menu Logical. If TRUE (default) a "Performance Metrics Menu" and related content are created in the Shiny app.
calib_menu Logical. If TRUE (default) a "Calibration Menu" and related content are created in the Shiny app.
key_metric A character string of length 1, with the key model performance metric. It should be the name of one of the columns in pm_data. The first performance metric is chosen by default.
key_metric_danger Two-element numeric vector defining the range of values to color as "alert" (in red) for the key_metric.
psi_danger Two-element numeric vector defining the range of values to color as "alert" (in red) for the Population Stability Index values.
feature_psi_danger
    Two-element numeric vector defining the range of values to color as "alert" (in red) for the Feature Stability Values.
feature_weighted_psi_danger
    Two-element numeric vector defining the range of values to color as "alert" (in red) for the weighted Feature Stability Values.
metadata A list with metadata values, see create_model_metadata.
. . . Further arguments passed to or from other methods (not currently used).

get_performance_metrics Performance Metrics

Description
Get performance metrics from regression and classification models.
Usage
get_performance_metrics(actual, predicted, metrics, scoreDate, groupVar, cutoff=0.5, modelVersion)
Arguments
actual A numeric vector of labels. For binary outcomes, labels must be coded as 0/1.
predicted A numeric vector of predicted values.
metrics A character vector. Options include "auc", "precision", "recall", "specificity", "f1Score", "ks", "ce", "log Loss", "brier", "mse", "rmse", "mae". It is possible to request more than one value (e.g., c("auc", "ks")). See details.
scoreDate A vector of class Date of the same length as predicted reflecting the corresponding date values for predicted. Defaults to Sys.Date( ).

groupVar An (optional) vector of class "factor" with the same length as predicted. This is used as a grouping variable in producing the metrics.

cutoff A numeric vector of length 1 with the cutoff for the predicted values.

modelVersion A vector (character or factor) of the same length as predicted representing the version of the model. Default is "1.0" for all predicted values. There cannot be more than one modelVersion for a given scoreDate.

Details

The metrics are:
- auc: Calculates the area under the curve for a binary classification model
- precision: True Postives/(True Positives+False Positives)
- recall: True Positives/(True Positives+False Negatives)
- specificity: True Negatives/(True Negatives+False Positives)
- f1Score: Calculates the f1 score
- ks: Calculates the Kolmogorov-Smirnov statistic
- ce: Calculates the classification error
- log Loss: Calculates the log loss or entropy loss for a binary outcome
- brier: Calculates the Brier score
- mse: Calculates the mean square error
- rmse: Calculates the root mean square error
- mae: Calculates the mean absolute error Value A tibble with unique values by modelVersion, scoreDate, and groupVar, along with the corresponding requested performance metrics.

Examples

```
set.seed(123)
N=10000
p=10
X←matrix(rnorm(N*p), nrow=N, ncol=p)
z←1+2*X[,1]+3*X[, 2]
pr←1/(1+exp(−z))
y←rbinom(N, 1, pr)
df←data.frame(y=y, X)
fit1←glm(y~, data=df, family="binomial")
pred←predict(fit1, df, type="response")
scoreDate=c(rep(Sys.Date( )-5, N/4),rep(Sys.Date( )-4, N/4), rep(Sys.Date( )-3, N/4), rep(Sys.Date( )-2, N/4))
get_performance_metrics(df$y, pred, metrics=c("auc", "ks", "ce"), scoreDate=scoreDate)
``` get_psi Population Stability Index

Description

The population stability is used to monitor the change in the distribution of a variable with respect to a reference distribution.

Usage get_psi(x, . . . )
S3 method for class 'inspect_ps'
get_psi(x, weight=NULL, . . . )
S3 method for class 'list'
get_psi(x, weight=NULL, . . . )

Arguments x An object created by inspect_ps.

. . . Further arguments passed to or from other methods (not currently used).

weight A numeric vector to scale the psi by the corresponding weights. If x is a list, there must be exactly one weight value for each variable in names(x).

Details

The index values (I) are created using the following formula:

$$I = \sum_{i=1}^{n}\left[\left(\frac{O_2}{\sum_O} - \frac{E_i}{\sum_E}\right) \times \log\left(\frac{O_i}{\sum_O} \Big/ \frac{E_i}{\sum_E}\right)\right]$$

where O and E are the observed (recent population) and expected (development sample) frequencies corresponding to bin i. Values of I<0.1 tend to be no cause for concern, 0.1<=I<0.25 tend to indicate some cause of concern, and I>=0.25 indicate a strong source of concern.

Value

A tibble containing the psi values.

inspect_calibration Inspect Model Calibration

Description

Inspect calibration of a (classification or regression) model predictions.

Usage inspect_calibration(actual, predicted, . . . )
Default S3 method:
inspect_calibration(actual, predicted, scoreDate, nBins=10, method="quantile", bdigits=4, confLevel=0.95, naAction="fail", groupVar, modelVersion, userBreaks, . . . )

Arguments

| | |
|---|---|
| actual | A numeric vector of labels. For binary outcomes, labels must be coded as 0/1. |
| predicted | A numeric vector of predicted values. |
| . . . | Further arguments passed to or from other methods (not currently used). |
| scoreDate | A vector of class Date of the same length as predicted reflecting the corresponding date values for predicted. Defaults to Sys.Date( ). |
| nBins | An integer with the number of bins to create from the predicted values. |
| method | A character string representing the method used to create the bins for the predicted values. Possible values are "quantile" (default), to create intervals with approximately the same number of observations in each bin, "bucker, to divide the values into equally spaced intervals, or "user" to create intervals from userspecified breaks (see userBreaks). |
| bdigits | An integer with the number of digits used in formatting the bin breaks. |
| confLevel | The confidence level used to construct confidence intervals for the mean actual values in each bin. Defaults to confLevel = 0.95. |
| naAction | A character string that specifies how to deal with missing values in the actual and predicted values. It will also check for NAs in the values of the following arguments, if supplied: scoreDate, groupVar, and modelVersion. Options are "fail" (default), in which case missing values are not allowed, or "omit, in which case rows with NAs in any of the aforementioned fields will be removed. |

| | |
|---|---|
| groupVar | An (optional) vector of class "factor" with the same length as predicted. This is used as a grouping variable in producing the metrics. |
| modelVersion | A vector (character or factor) of the same length as predicted representing the version of the model. Default is "1.0" for all predicted values. There cannot be more than one modelVersion for a given scoreDate. |
| userBreaks | A user-specified numeric vector of breaks in the predicted values from which to create bins. It is required when method = "user", and ignored otherwise. |

Details inspect_calibration returns the observed values of an event versus the predicted values.

Currently, the function works for binary classification and regression tasks. It does not handle multi-class predictions. Bins are created from the predicted values based on the method argument. The breaks are determined from the predicted values at the first scoreDate observed in the data (i.e., min(scoreDate)).

The extreme values for the breaks will get automatically adjusted if min(predicted) or max(predicted) across all score dates fall outside the extreme values obtained from the first scoreDate. The bin ranges should be consistent over time within the same level of groupVar.

Confidence intervals for the binomial observed event proportions in each bin are calculated using the Clopper-Pearson method (Clopper and Pearson, 1934).

Value

An object of class "inspect_calibration", which is a tibble containing the modelVersion, scoreDate, groupVar along with the following fields:

- bin: The bins created from the predicted values. See details.
- obsCount: The number of observations in each bin.
- eventCount: The number of events (1's) in each bin (only returned for binary 0/1 responses) actual values).
- meanActual: Mean of actual values in each bin.
- meanPredicted: Mean of predicted values in each bin.
- meanActualCIlower: Lower value for the confidence interval for the mean actual values
- meanActualCIupper: Upper value for the confidence interval for the mean actual values.
- baseActual: Mean of actual values over all bins.
- lift: meanActual/baseActual.
- cumObsCount: Cumulative number of observations.
- cumEventCount: Cumulative number of events (only returned for binary 0/1 responses).
- cumMeanActual: Cumulative mean of actual values.
- cumLift: Cumulative Lift.

Examples

```
set.seed(3)
N=10000
p=10
X←matrix(rnorm(N*p), nrow=N, ncol=p)
z←-1+2*X[,1]+3*X[, 2]
pr←1/(1+exp(-z))
y←rbinom(N, 1, pr)
df←data.frame(y, X)
fit1←glm(y~X1+X2+X6+X7, data=df, family="binomial")
pred←predict(fit1, df, type="response")
groupVar=gl(3, k=2, length=length(df$y), labels=paste0
    ("Segment", 1:3, sep=" "))
df←inspect_calibration(actual=df$y,
    predicted=pred,
    groupVar=groupVar)
head(df)
``` inspect_ps Inspect Population Stability

Description

The population stability is used to monitor the change in the distribution of a variable with respect to a reference distribution.

Usage inspect_ps(trainVar, scoreVar, . . . )
Default S3 method:
inspect_ps(trainVar, scoreVar, nBins=10,
    method="quantile", continuous=4, bdigits=4,
        naAction="pass",
    trainDate, scoreDate, trainGroupVar, scoreGroupVar,
        modelVersion, userBreaks,
    . . . )
S3 method for class 'data.frame'
inspect_ps(trainData, scoreData, parallel=TRUE,
    nCore=NULL, . . . )

Arguments

| | |
|---|---|
| trainVar | A vector (numeric or factor) with reference values for the variable to measure drift in distribution. |
| scoreVar | A vector (numeric or factor) with new values for the same variable in trainVar. |
| . . . | Further arguments passed to or from other methods (not currently used). |
| nBins | An integer with the number of bins to create from numeric features. |
| method | A character string. Possible values are "quantile" (default) if you want to create intervals for numeric features with approximately the same number of observations in each group, "bucket" if you want to divide the values into equally spaced intervals, or "user" to create intervals from user-specified breaks (see userBreaks). |
| continuous | Specifies the threshold for when bins should be created from numeric features. If there are less or equal than n (i.e., continuous = n) unique values in the numeric feature, it is coverted to a factor without binning. The default is continuous = 4. |
| bdigits | An integer with the number of digits used in formatting the bin breaks. |
| naAction | A character string that specifies how to deal with missing values in trainVar and/or scoreVar. Possible values are "pass" (default), in which case new bins labeled "Missing" are created for the missing values. Alternatively, "fail" will ensure no missing values are passed to the function. |
| trainDate | A vector of class Date (see help("Date")) of the same length as trainVar reflecting the corresponding date value for trainVar. Defaults to Sys.Date( ). |

| | |
|---|---|
| scoreDate | A vector of class Date of the same length as scoreVar reflecting the corresponding date values for scoreVar. Defaults to Sys.Date( ). |
| trainGroupVar | An (optional) vector of class "factor" with the same length as trainVar. This is used as a grouping variable in producing population stability results. |
| scoreGroupVar | An (optional) vector of class "factor" with the same length as scoreVar. This is used as a grouping variable in producing the population stability results. |
| modelVersion | A vector (character or factor) of the same length as scoreVar representing the version of the model. Default is "1.0" for all scoreVar values. There cannot be more than one modelVersion for a given scoreDate. |
| userBreaks | A user-specified numeric vector of breaks in the numeric features from which to create bins. It is required when method = "user", and ignored otherwise. |
| trainData | A data frame including the reference values for the variables to measure drift in distribution. |
| scoreData | A data frame including the new values for the same variable included in trainData. parallel If TRUE, computations are performed in parallel, otherwise they are done sequentially. This option is only valid if ncol(trainData) > 1. |
| nCore | The number of cores used. Default is: number of available cores-1. |

Details
The index values (I) are created using J-divergence (Jeffreys, 1946):

$$I = \left(\frac{O_i}{\sum_O} - \frac{E_i}{\sum_E}\right) \times \log\left(\frac{O_i}{\sum_O} \bigg/ \frac{E_i}{\sum_E}\right)$$

where O and E are the observed (recent population) and expected (development sample) frequencies corresponding to bin i.

In the event a given bin contains no trainVar or scoreVar observations, the index values are adjusted as follows:

$$I = \left(\frac{O_i + \gamma}{\sum_O} - \frac{E_i + \gamma}{\sum_E}\right) \times \log\left(\frac{O_i + \gamma}{\sum_O} \bigg/ \frac{E_i + \gamma}{\sum_E}\right)$$

where $\gamma$ is an adjustment factor set at 0.5.

Value
The default inspect_ps method returns an object of class inspect_ps, which is a tibble with the following columns:
modelVersion The model version
groupVar The Grouping variable
train_date Values corresponding to trainDate
score_date Values corresponding to scoreDate
bin Binvalues
train_n Number of trainVar cases
score_n Number of scoreVar cases
train_pctn Percentage of trainVar cases
score_pctn Percentage of scoreVar cases
index Population Stability
The data.frame method returns a list containing objects of class inspect_ps.

Examples

```
set.seed(1)
trainVar=runif(2000)
scoreVar=jitter(runif(2000), amount=0.5)
trainVar[1:10]←NA
trainGroupVar=gl(3, k=2, length=length(trainVar),
  labels=paste0("Segment", 1:3, sep=" "))
scoreGroupVar=gl(3, k=2, length=length(scoreVar),
  labels=paste0("Segment", 1:3, sep=" "))
trainDate=rep(Sys.Date( )-10, 2000)
scoreDate=c(rep(Sys.Date( )-5, 500),rep(Sys.Date( )-4,
  500),rep(Sys.Date( )-3, 500), rep(Sys.Date( )-2, 500))
ps←inspect_ps(trainVar,
  scoreVar,
  trainDate=trainDate,
  scoreDate=scoreDate,
  trainGroupVar=trainGroupVar,
  scoreGroupVar=scoreGroupVar)
get_psi(ps)
``` plot_calibration Plot Calibration Curves
Description
Plot calibration curves from a 'inspect_calibration' object.
Usage
plot_calibration(x, diagCol="grey", confInt=FALSE, scalePoints=FALSE, interactive=TRUE, xlim=NULL, ylim=NULL,
xbreaks=NULL, ybreaks=NULL, xlab=NULL, ylab=NULL)
Arguments

| | |
|---|---|
| x | A tibble or data.frame obtained from inspect_calibration. See example below. |
| diagCol | Color of diagonal line. |
| confInt | Add confidence intervals of the observed event rates? |
| scalePoints | Make size of points in plot proportional to the number of observations? |
| interactive | If TRUE, an interactive plot is created using plotly. |
| xlim, ylim | Numeric vectors of length 2, giving the x and y coordinates ranges. |
| xbreaks, ybreaks | Points at which x, y gridlines appear. |
| xlab, ylab | Titles for the x, y axes. |

Examples

```
library(dplyr)
set.seed(3)
N=10000
p=10
X←matrix(rnorm(N*p), nrow=N, ncol=p)
z←-1+2*X[,1]+3*X[, 2]
``` pr←1/(1+exp(-z))
y←rbinom(N, 1, pr)
df←data.frame(y, X)
fit1←glm(y~X1+X2+X6+X7, data=df, family="binomial")
pred←predict(fit1, df, type="response")
groupVar=gl(3, k=2, length=length(df$y), labels=paste0("Segment", 1:3, sep=" "))
calib inspect_calibration(actual=df$y,
predicted=pred,
groupVar=groupVar)
calib_all←calib %>% filter(groupVar=="All")
plot_calibration(calib_all)
plot_inspect_ps Population Stability Plot
Description
Plotting function for Population Stability.
Usage
plot_inspect_ps(x, xlab="Variable range",
ylab="Population Distribution", title=NULL)
Arguments
x A tibble or data.frame after appropriate filtering from objects of class inspect_ps.
See example below.
xlab A character string of length 1 giving the title for the x axis.
ylab A character string of length 1 giving the title for the y axis.
title Plot title.

Examples set.seed(1)
trainVar=runif(2000)
scoreVar=jitter(runif(2000), amount=0.5)
trainVar[1:10]←NA
trainGroupVar=gl(3, k=2, length=length(trainVar), labels=paste0("Segment", 1:3, sep=" "))
scoreGroupVar=gl(3, k=2, length=length(scoreVar), labels=paste0("Segment", 1:3, sep=" "))
trainDate=rep(Sys.Date( )-10, 2000)
scoreDate=c(rep(Sys.Date( )-5, 500),rep(Sys.Date( )-4, 500),rep(Sys.Date( )-3, 500), rep(Sys.Date( )-2, 500))
ps←inspect_ps(trainVar,
scoreVar,
trainDate=trainDate,
scoreDate=scoreDate,
trainGroupVar=trainGroupVar,
scoreGroupVar=scoreGroupVar)
ps.1←dplyr::filter(ps, groupVar=="All" & score_date==Sys.Date( )-2)
plot_inspect_ps(ps.1)

Embodiments of methods, systems, and apparatus herein are described through reference to the drawings.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer implemented system for monitoring and improving a performance of one or more machine learning models, the system including:
at least one memory storage device storing one or more model data sets representative of a machine learning model;
at least one training engine configured to train the machine learning model; and
at least one computer processor configured to, when executing a set of machine-readable instructions:
receive or store the one or more model data sets representative of the machine learning model, wherein the machine learning model has being trained with a first set of training data;
analyze the first set of training data, based on one or more performance parameters for the machine learning model, to generate one or more performance data sets, wherein the one or more performance parameters comprises a population stability index value configured to assess a stability of one or more output data sets of the machine learning model;
process the one or more performance data sets to determine one or more values representing a performance of the machine learning model;
select a second set of training data based on the one or more performance data sets;

re-train the machine learning model using the second set of training data; and display, at a display device, the one or more values representing the performance of the machine learning model, including displaying the population stability index value at the display device in response to a user input;

wherein the population stability index value is generated based on a J-divergence measure and is configured to assess the stability of the one or more output data sets based on a pre-determined threshold value.

2. The system of claim 1, wherein the computer processor is configured to analyze the one or more output data sets of the machine learning model to generate the one or more performance data sets.

3. The system of claim 1, wherein the computer processor is configured to adjust one or more weights or one or more filters of the machine learning model based on the second set of training data.

4. The system of claim 2, wherein the computer processor is configured to store the adjusted one or more weights or one or more filters of the machine learning model.

5. The system of 1, wherein the one or more performance parameters comprises at least one of: a regression feature and a classification feature of the machine learning model.

6. The system of claim 1, wherein the computer processor is configured to process the first set of training data to determine at least one of: model development data and scoring data.

7. The system of claim 1, wherein the first set of training data comprises labelled data.

8. The system of claim 6, wherein the performance data sets comprise features of the first set of training data.

9. The system of claim 6, wherein the computer processor is configured to select the second set of training data based on the model development data or scoring data.

10. A computer-implemented method for monitoring and improving a performance of a machine learning model, the method comprising:

receiving or storing one or more model data sets representative of the machine learning model, wherein the machine learning model has being trained with a first set of training data;

analyzing the first set of training data, based on one or more performance parameters for the machine learning model, to generate one or more performance data sets, wherein the one or more performance parameters comprises a population stability index value configured to assess a stability of one or more output data sets of the machine learning model;

processing the one or more performance data sets to determine one or more values representing a performance of the machine learning model;

selecting a second set of training data based on the one or more performance data sets;

re-training the machine learning model using the second set of training data; and displaying, at a display device, the one or more values representing the performance of the machine learning model, including displaying the population stability index value at the display device in response to a user input;

wherein the population stability index value is generated based on a J-divergence measure and is configured to assess the stability of the one or more output data sets based on a pre-determined threshold value.

11. The method of claim 10, comprising analyzing the one or more output data sets of the machine learning model to generate the one or more performance data sets.

12. The method of claim 11, comprising adjusting one or more weights or one or more filters of the machine learning model based on the second set of training data.

13. The method of claim 12, comprising storing the adjusted one or more weights or one or more filters of the machine learning model.

14. The method of 12, wherein the one or more performance parameters comprises at least one of: a regression feature and a classification feature of the machine learning model.

15. The method of claim 10, comprising processing the first set of training data to determine at least one of: model development data and scoring data.

16. The method of claim 10, wherein the first set of training data comprises labelled data.

17. The method of claim 15, wherein the performance data sets comprise features of the first set of training data.

18. The method of claim 15, comprising selecting the second set of training data based on the model development data or scoring data.

19. A computer implemented system for determining an output based on a set of input using a machine learning model, the system including:

at least one memory storage device storing one or more model data sets representative of a machine learning model; and at least one computer processor configured to, when executing a set of machine-readable instructions, execute the one or more model data sets representative of the machine learning model to generate an output based on a set of input data, wherein the machine learning model has being trained with a first set of training data, and wherein the processor is configured to:

analyze the first set of training data, based on one or more performance parameters for the machine learning model, to generate one or more performance data sets, wherein the one or more performance parameters comprises a population stability index value configured to assess a stability of one or more output data sets of the machine learning model;

process the one or more performance data sets to determine one or more values representing a performance of the machine learning model;

select a second set of training data based on the one or more performance data sets;

re-train the machine learning model using the second set of training data; and display, at a display device, the one or more values representing the performance of the machine learning model, including displaying the population stability index value at the display device in response to a user input;

wherein the population stability index value is generated based on a J-divergence measure and is configured to assess the stability of the one or more output data sets based on a pre-determined threshold value.

* * * * *